(12) United States Patent
Jackson

(10) Patent No.: US 8,474,897 B1
(45) Date of Patent: Jul. 2, 2013

(54) STORAGE ASSEMBLY FOR USE IN VEHICLES

(75) Inventor: Donald W. Jackson, West Mansfield, OH (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 13/350,454

(22) Filed: Jan. 13, 2012

(51) Int. Cl.
*B60N 3/00* (2006.01)

(52) U.S. Cl.
USPC .................. 296/37.8; 296/24.34; 296/37.6

(58) Field of Classification Search
USPC ............................................ 296/37.8, 24.34
See application file for complete search history.

(56) References Cited

U.S. PATENT DOCUMENTS

| | | | |
|---|---|---|---|
| D218,438 S | 8/1970 | Shook et al. | |
| D279,426 S | 7/1985 | Dzak | |
| D314,539 S | 2/1991 | Swanner | |
| 5,253,838 A | 10/1993 | Spykerman | |
| 5,524,958 A | 6/1996 | Wieczorek et al. | |
| D395,033 S | 6/1998 | Jackson | |
| 6,250,527 B1 | 6/2001 | Mizue et al. | |
| 6,435,587 B1 * | 8/2002 | Flowerday et al. | 296/37.8 |
| D541,209 S | 4/2007 | Castator et al. | |
| 7,533,918 B2 | 5/2009 | Spykerman et al. | |
| 7,875,226 B2 | 1/2011 | Ma et al. | |
| 2005/0035618 A1 * | 2/2005 | Toth et al. | 296/24.34 |
| 2008/0143135 A1 * | 6/2008 | Singh et al. | 296/37.8 |
| 2010/0066113 A1 | 3/2010 | Browne et al. | |

* cited by examiner

*Primary Examiner* — Joseph Pape
*Assistant Examiner* — Dana Ivey
(74) *Attorney, Agent, or Firm* — Armstrong Teasdale LLP

(57) ABSTRACT

A storage assembly for use in a vehicle is provided. The storage assembly includes a body that includes at least one surface, at least one sidewall, and at least one recess portion defined within the surface. The recess portion is sized to contain at least one object therein. At least one holder is coupled to the sidewall, wherein the holder includes at least one opening defined therein that is sized to receive a container therein. At least two legs extend from the body for supporting the body a predefined distance above a floor of the rear portion of the vehicle. The two legs are spaced a predefined distance apart such that a passageway is defined therebetween. A receptacle is removably coupled within the passageway such that at least a portion of at least one item transported within the vehicle may extend through the passageway when the receptacle is removed.

20 Claims, 3 Drawing Sheets

US 8,474,897 B1

STORAGE ASSEMBLY FOR USE IN VEHICLES

BACKGROUND

The field of the invention relates generally to vehicles and, more particularly, to a storage assembly for use in a vehicle.

At least some known vehicles, such as automobiles, may include at least one console. For example, at least some known vehicles include a center console that includes control-bearing surfaces. The center console is generally located in the center of a front portion of the vehicle. For example, the console may be formed integral with the dashboard and extend to the dashboard through a transmission tunnel positioned between the driver's seat and the front passenger's seat. A gear stick may be mounted in the front portion of the console such that the driver may be able to reach the stick.

Known consoles may also include a wide variety of storage compartment(s) and/or cup holder(s). Generally, however, known consoles do not include the combination of cup holder(s), a storage portion(s), and a waste receptacle(s). Moreover, because such consoles are generally positioned in the front portion of the vehicle, passengers in the rear seats may be unable to reach the console. As a result, the passenger(s) in the rear portion of the vehicle may be unable to easily place a cup within the cup holder and/or store any items within the console. As result, some vehicles, such as sports utility vehicles or mini vans, may also include at least one console positioned in the rear portion of the vehicle. However, positioning consoles in the rear portion of the vehicle may limit storage space and/or useful occupancy space within the vehicle. For example, when a console is positioned in the rear portion of the vehicle, relatively long items, such as skis, may no longer fit inside the vehicle. More specifically, items, such as skis, may extend within the entire length of the rear portion of the vehicle. When a console is positioned in the rear portion of the vehicle, the console may cover a substantial portion of the rear portion and, as a result, the skis may not be positioned in the vehicle at the same time.

BRIEF DESCRIPTION

In one embodiment, a storage assembly for use in a rear portion of a vehicle is provided. The storage assembly includes a body that includes at least one surface, at least one sidewall, and at least one recess portion defined within the surface. The recess portion is sized to contain at least one object therein. At least one holder is coupled to the sidewall, wherein the holder includes at least one opening defined therein that is sized to receive a container therein. At least two legs extend from the body for supporting the body a predefined distance above a floor of the rear portion of the vehicle. The two legs are spaced a predefined distance apart such that a passageway is defined therebetween. A receptacle is removably coupled within the passageway such that at least a portion of at least one item transported within the vehicle may extend through the passageway when the receptacle is removed.

In another embodiment, a vehicle is provided. The vehicle includes at least one seat positioned in a rear portion of the vehicle. The vehicle also includes a storage assembly positioned in the rear portion and positioned proximate to the seat. The storage assembly includes a body that includes at least one surface, at least one sidewall, and at least one recess portion defined within the surface. The recess portion is sized to contain at least one object therein. At least one holder is coupled to the sidewall, wherein the holder includes at least one opening defined therein that is sized to receive a container therein. At least two legs extend from the body for supporting the body a predefined distance above a floor of the rear portion of the vehicle. The two legs are spaced a predefined distance apart such that a passageway is defined therebetween. A receptacle is removably coupled within the passageway such that at least a portion of at least one item transported within the vehicle may extend through the passageway when the receptacle is removed.

In yet another embodiment, a storage assembly for use in a rear portion of a vehicle is provided. The storage assembly includes a body that includes at least one surface, a first sidewall facing a front portion of the vehicle, a second sidewall facing the rear portion of the vehicle, a third sidewall facing a first side portion of the vehicle, a fourth sidewall facing a second side portion of the vehicle, and at least one recess portion defined within the surface. The recess portion is sized to contain at least one object therein. The storage assembly also includes a plurality of holders that include a first holder coupled to the first sidewall, a second holder coupled to the second sidewall, a third holder coupled to the third sidewall, and a fourth holder coupled to the fourth sidewall. The first holder is configured to extend outwardly towards the front portion of the vehicle and to retract inwardly towards the rear portion of the vehicle. The second holder is configured to extend outwardly towards the rear portion of the vehicle and to retract inwardly towards the front portion of the vehicle. The third holder is configured to extend outwardly towards the first side portion of the vehicle and to retract inwardly towards the second side portion of the vehicle. The fourth holder is configured to extend outwardly towards the second side portion of the vehicle and to retract inwardly towards the first side portion of the vehicle. Each of the holders includes at least one opening defined therein that is sized to receive a container therein. At least two legs extend from the body for supporting the body a predefined distance above a floor of the rear portion of the vehicle. The two legs are spaced a predefined distance apart such that a passageway is defined therebetween. A receptacle is removably coupled within the passageway such that at least a portion of at least one item transported within the vehicle may extend through the passageway when the receptacle is removed.

DETAILED DESCRIPTION

The exemplary systems, apparatus, and methods described herein overcome at least some disadvantages of known consoles used with vehicles. More specifically, the embodiments described herein include a console or storage assembly for use in a rear portion of a vehicle, wherein the storage assembly includes a combination of various features and is designed such that the console does not block or inhibit the ability to load relatively long items, such as skis, within the rear portion of the vehicle. For example, the storage assembly described herein includes the combination of at least one storage area, at least one holder, and a receptacle for waste or additional storage. Moreover, since the storage assembly is positioned in the rear portion of the vehicle, a passenger in the rear portion is able to reach the storage assembly. While the storage assembly is positioned in the rear portion of the vehicle, the storage assembly does not inhibit the ability to load relatively long items, such as skis, within the rear portion of the vehicle. More specifically, the storage assembly includes a passageway defined therein and the receptacle is removably coupled within the passageway. When the receptacle is removed, longer items, such as skis, can extend in the rear portion of the vehicle by having at least a portion of the skis be positioned within the passageway.

Figure 1:
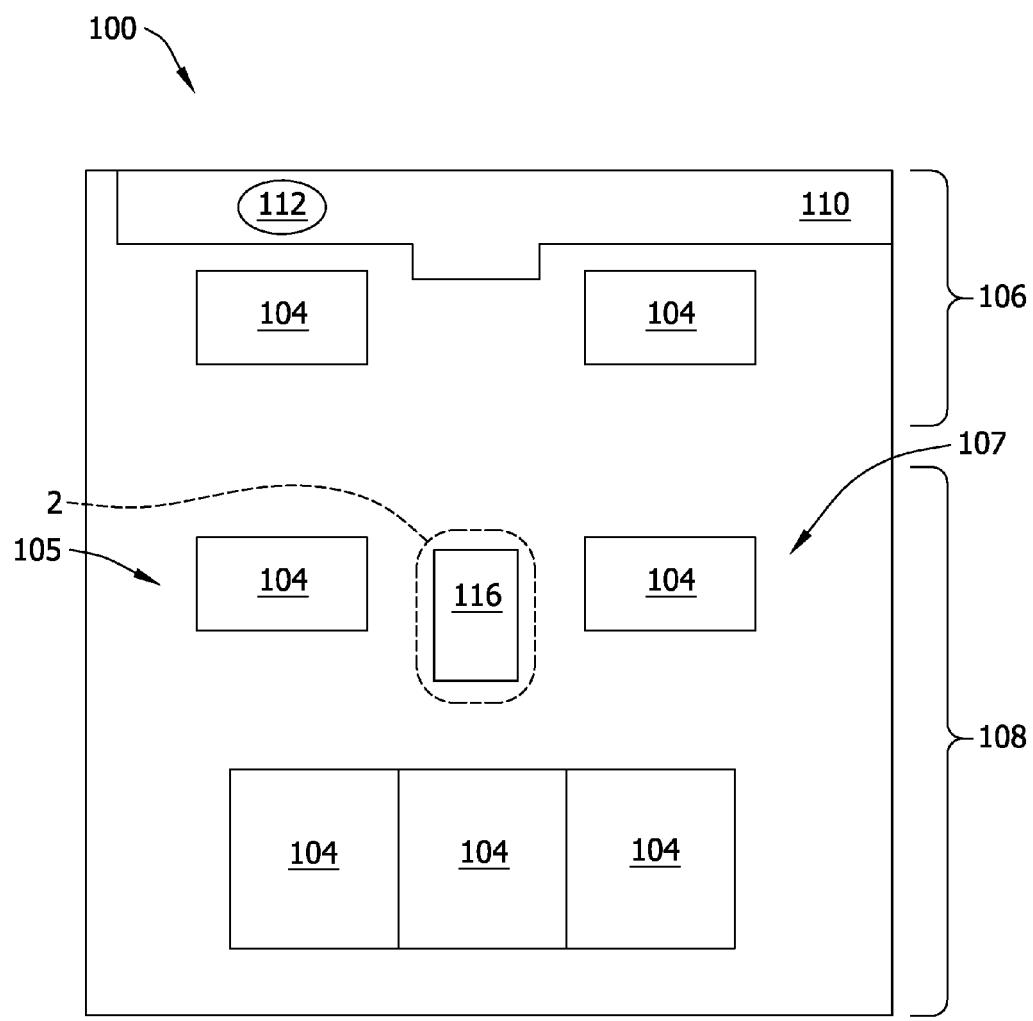
FIG. 1 is a block diagram of an exemplary vehicle.

FIG. 1 illustrates an exemplary embodiment of a vehicle 100. It should be noted that the term "vehicle" as used herein refers generally to an autocar, motor car, or car that is a wheeled motor vehicle that may be used for transporting passengers and that carries its own engine or motor (not shown). For example, the vehicle may include a gasoline engine or an internal combustion engine that uses gasoline to enable the vehicle to move. The vehicle may also be an electric vehicle that includes one or more electric motors (not shown) that are used to provide propulsion to the vehicle. Energy, such as electrical energy, used to propel vehicles may come from various sources, such as, but not limited to, an on-board rechargeable battery and/or an on-board fuel cell. In one embodiment, the electric vehicle may be a hybrid vehicle that captures and stores energy generated by braking. Moreover, a hybrid electric vehicle may use energy stored in an electrical source, such as a battery, to continue operating when idling to conserve fuel. Some hybrid electric vehicles are capable of recharging the battery by plugging into a power receptacle, such as a general power outlet. Another example of an electric vehicle is a fuel-cell vehicle, which uses only electrical energy for propulsion.

In the exemplary embodiment, vehicle 100 is a mini van that includes at least one seat 104. More specifically, vehicle 100 includes seven seats 104, with two seats 104 positioned in a front portion 106 of vehicle 100 and five seats 104 positioned in a rear portion 108 of vehicle. Moreover, in the exemplary embodiment, a center console 110 is positioned in vehicle front portion 106. Alternatively, center console 110 may be positioned in any other suitable portion of vehicle 100. In the exemplary embodiment, a steering wheel 112 is coupled to console 110. It should be noted that, as used herein, the term "couple" is not limited to a direct mechanical, electrical, and/or communication connection between components, but may also include an indirect mechanical, electrical, and/or communication connection between multiple components.

Vehicle 100 also includes a rear console or storage assembly 116 positioned in vehicle rear portion 108. Rear portion 108 also includes a first side portion 105 and a second side portion 107. Storage assembly 116 may be removably coupled to a surface (not shown), such as a floor, of vehicle 100 or storage assembly 116 may be integrally formed with the surface. In the exemplary embodiment, storage assembly 116 is positioned proximate to at least one seat 104 in vehicle rear portion 108. More specifically, in the exemplary embodiment, storage assembly 116 is positioned between two seats 104 in vehicle rear portion 108. Alternatively, storage assembly 116 may be positioned in any other suitable portion of vehicle 100 that enables storage assembly 116 to function as described herein. In the exemplary embodiment, and as discussed in more detail below, storage assembly 116 is configured to include a combination of various features and, at the same time, does not block or inhibit the ability to load relatively long items (not shown), such as skis, within vehicle rear portion 108.

Figure 2:
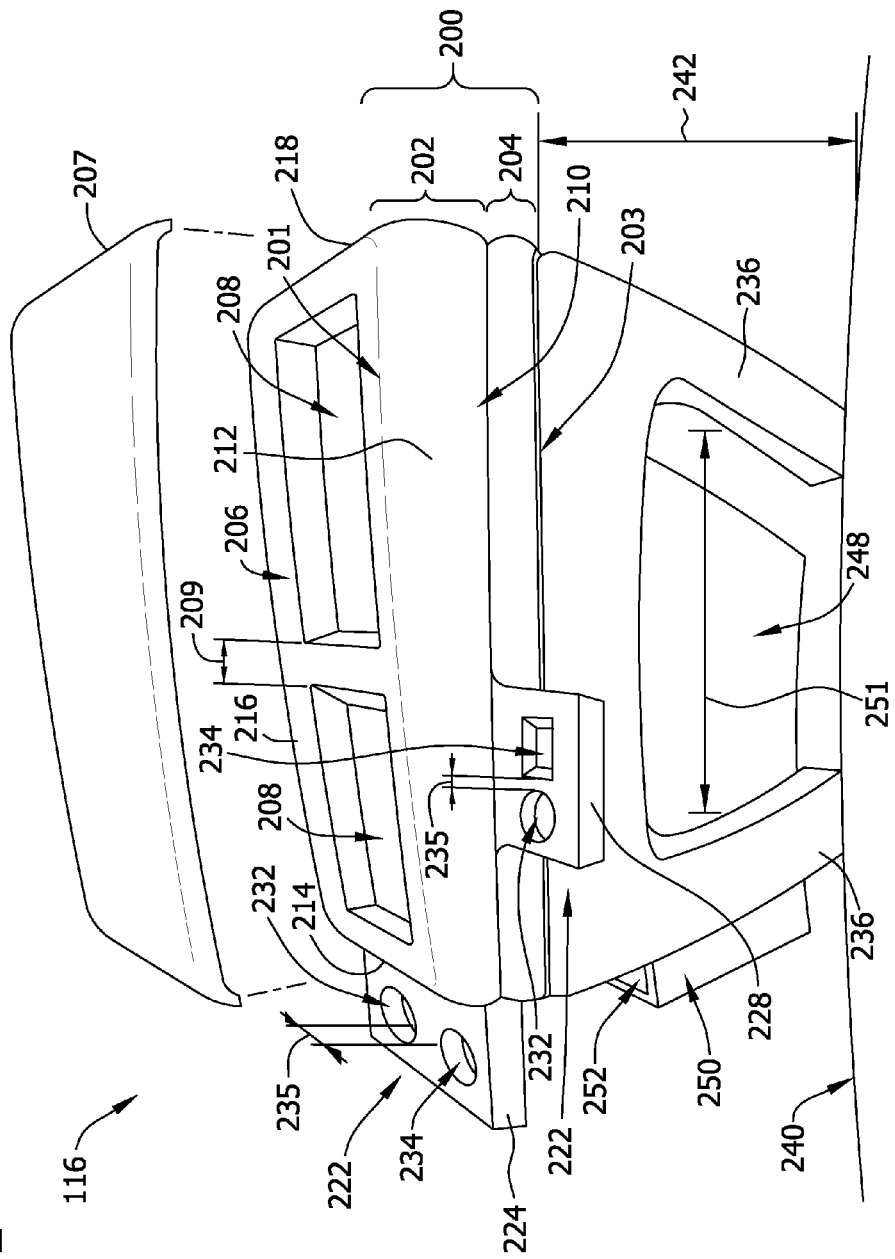
FIG. 2 is a schematic of a partially exploded side view of an exemplary storage assembly that may be used with the vehicle shown in FIG. 1 and taken along area 2.
Figure 3:
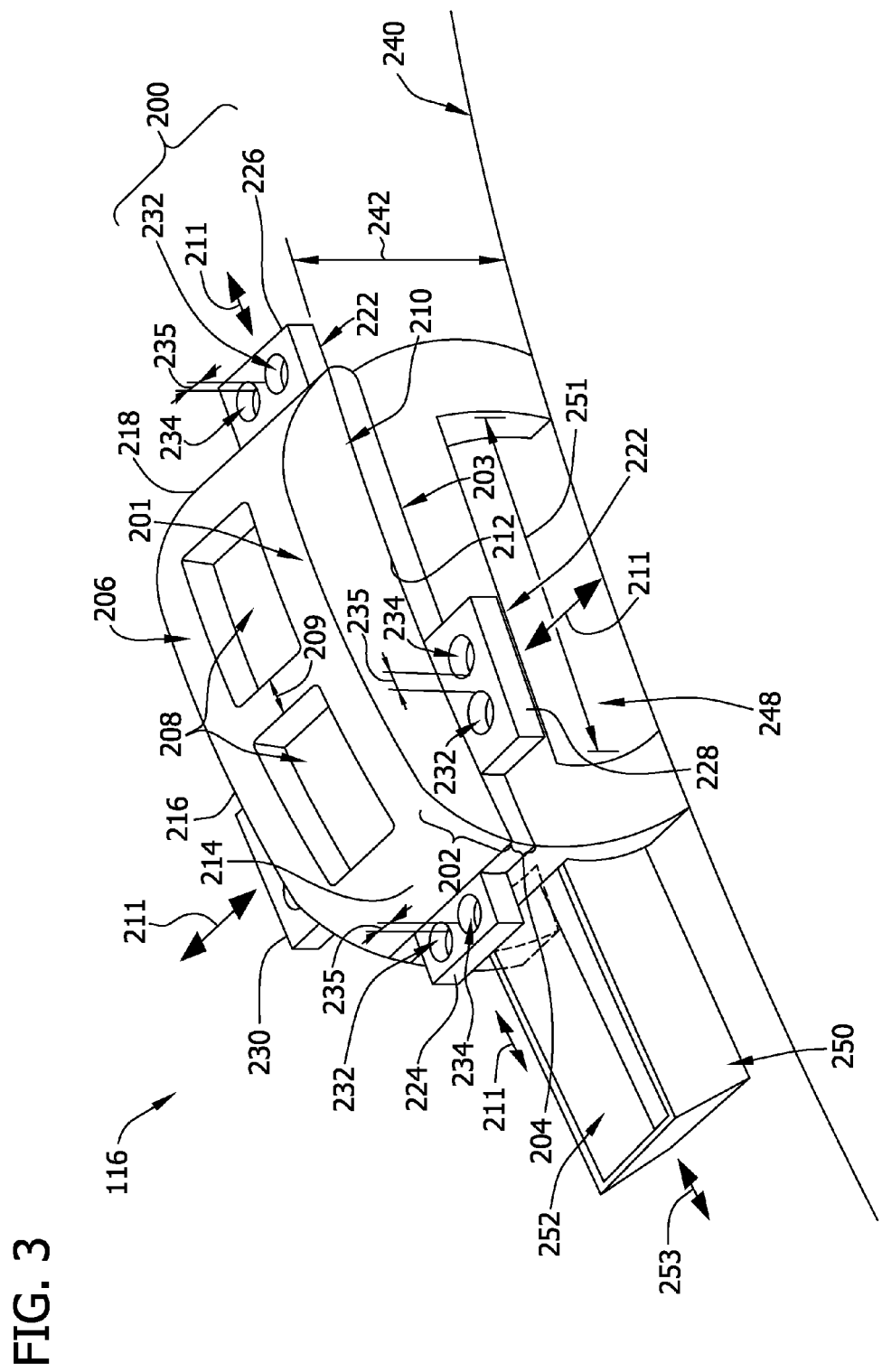
FIG. 3 is a schematic of a perspective view of the storage assembly shown in FIG. 2.

FIG. 2 illustrates a side view of storage assembly 116 and taken along area 2 (shown in FIG. 1). FIG. 3 illustrates a perspective view of storage assembly 116. In the exemplary embodiment, storage assembly 116 includes a main body 200 that includes a first portion 202 and a second portion 204, wherein first and second portions, 202 and 204, respectively, may be removably coupled with each other or integrally formed together as a single piece. Main body 200 also includes at least one surface, such as surface 206. More specifically, in the exemplary embodiment, surface 206 is a top surface of main body first portion 202.

Surface 206 includes at least one recess portion 208 defined therein. In the exemplary embodiment, surface 206 includes two recess portions 208 that are spaced a pre-defined distance 209 from each other. In the exemplary embodiment, each recess portion 208 is substantially rectangular and each recess portion 208 is configured to contain at least one object (not shown) therein. For example, a user may place coin(s) (not shown) or book(s) (not shown) within recess 208. A cover 207 may be removably coupled to at least a portion of main body first portion 202 such that surface 206 is substantially enclosed by cover 207. When surface 206 is substantially enclosed by cover 207, each recess portion 208 is covered such that object(s) are securely contained within each recess portion 208.

Main body 200 also includes at least one sidewall 210, wherein sidewall 210 extends from an edge 201 of main body first portion 202 to an edge 203 of main body second portion 204. More specifically, main body 200, in the exemplary embodiment, includes four sidewalls 210 that includes a left sidewall 212 facing vehicle first side portion 105 (shown in FIG. 1), a front sidewall 214 facing vehicle front portion 106 (shown in FIG. 1) and coupled to left sidewall 212, a right sidewall 216 facing vehicle second side portion 107 (shown in FIG. 1) and coupled to front sidewall 214, and a rear sidewall 218 facing vehicle rear portion 108 (shown in FIG. 1) and coupled to right sidewall 216 and to left sidewall 212. At least one holder 222 is coupled to at least one sidewall 210. More specifically, in the exemplary embodiment, a first holder 224 is coupled to front sidewall 214, a second holder 226 is coupled to rear sidewall 218, a third holder 228 is coupled to left sidewall 212, and a fourth holder 230 is coupled to right sidewall 216.

In the exemplary embodiment, each holder 222 is a deployable structure that is configured to protrude in and out of each sidewall 210 as shown by arrows 211. For example, each holder 222 may be coupled within an opening (not shown) defined within each sidewall 210 and may be configured to move in and out of the opening when holder 222 is pushed inward. More specifically, in the exemplary embodiment, when holder 222 is extended from the opening, holder 222 can be pushed inward such that holder 222 may protrude in towards sidewall 210 and at least a portion of holder 222 may be inserted within the opening. When holder 222 is inserted within the opening, holder 222 cannot be used. When holder 222 is positioned within the opening, holder 222 can be pushed inward again such that holder 222 may actuate and extend from the opening such that holder 222 may protrude outwardly from sidewall 210. When holder 222 protrudes outwardly from sidewall 210, holder 222 can be used. For example, in the exemplary embodiment, first holder 224 is configured to extend outwardly towards vehicle front portion 106 and to retract inwardly towards vehicle rear portion 108. Second holder 226 is configured to extend outwardly towards vehicle rear portion 108 and to retract inwardly towards vehicle front portion 106. Third holder 228 is configured to extend outwardly towards vehicle first side portion 105 and to retract inwardly towards vehicle second side portion 107. Fourth holder 230 is configured to extend outwardly towards vehicle second side portion 107 and to retract inwardly towards vehicle first side portion 105.

Each holder 222, in the exemplary embodiment, includes at least one opening, such as opening 232 and opening 234 that are positioned a predefined distance 235 from each other, in holder 222. Openings 232 and 234 enable a container (not shown) to be positioned therein. For example, in one embodiment, opening 232 may be substantially circular such that a cylindrical object, such as a cup (not shown) may be positioned therein. Opening 234 may be substantially rectangular, such that a different type of container, such as a fry container (not shown), may be positioned therein. In another embodiment, openings 232 and 234 may each be substantially circular or substantially rectangular. Alternatively, openings 232 and 234 may be any other shape that enables storage assembly 116 to function as described herein. Openings 232 and 234 can each be seen and used when holder 222 protrudes outwardly from sidewall 210.

In the exemplary embodiment, storage assembly 116 includes at least two legs 236 coupled to main body 200. More specifically, storage assembly 116 includes four legs 236 that extend outwardly from main body second portion 204 to a surface 240 of vehicle 100 (shown in FIG. 1) such that main body 200 is positioned a predefined distance 242 substantially vertical from surface 240. In the exemplary embodiment, surface 240 is a floor of vehicle 100. Moreover, in the exemplary embodiment, legs 236 may be removably coupled to main body second portion 204 or legs 236 may be integrally formed to main body second portion 204.

In the exemplary embodiment, each two legs 236 are spaced a predefined distance 251 from each other such that a channel or passageway 248 is defined therebetween. A receptacle 250 is removably coupled within passageway 248. In the exemplary embodiment, receptacle 250 is configured to slide in and out of passageway 248 as shown by arrows 253. Moreover, in the exemplary embodiment, receptacle 250 is substantially rectangular and has a cavity 252 defined therein such that items, such as waste products (not shown), may be stored therein. Moreover, passageway 248 is sized and shaped such that receptacle 250 may be positioned therein. While storage assembly 116 is positioned in vehicle rear portion 108 (shown in FIG. 1), storage assembly 116 does not block or inhibit the ability to load relatively long items, such as skis (not shown), within vehicle 100. More specifically, receptacle 250 can be removed from within passageway 248. When receptacle 250 is removed, items, such as the skis, can extend in vehicle rear portion 108 by having at least a portion of the skis be positioned within passageway 248.

In the exemplary embodiment, storage assembly 116 may be fabricated of polymers of high molecular mass, such as plastic or polypropylene. In the exemplary embodiment, each component of storage assembly 116 may be composed of the same material such that storage assembly 116 has a consistent look and feel to it. For example, main body 200, cover 207, holders 222, legs 236, and receptacle 250 may all be composed of plastic polypropylene. Alternatively, each component of storage assembly 116, such as main body 200, cover 207, holders 222, legs 236, and receptacle 250 may all be composed of different materials. Storage assembly 116 may also be fabricated with a metal framework (not shown), and the plastic or polypropylene material may be coupled to or formed onto the metal framework. At least a portion of storage assembly 116 may also be covered with padding (not shown), such as a foam padding. Alternatively, storage assembly 116 may be composed of any other suitable material that enables storage assembly 116 to function as described herein. One or more types of materials may be selected based on suitability for one or more manufacturing techniques, dimensional stability, cost, moldability, workability, rigidity, and/or other characteristic of the material(s).

During use, a user may store several items within storage assembly 116. For example, cover 207 may be removed from main body first portion 202 such that surface 206 is exposed. The user can then place objects, such as coins or books, within each recess portion 208. The user can then couple cover 207 to main body first portion 202 such that surface 206 is substantially enclosed by cover 207. As a result, each recess 208 is covered and the objects are securely contained within each recess 208. The user can also place a container, such as a cup and/or a fry container, for example, within holders 222. For example, in the exemplary embodiment, when holder 222 is protruded outwardly from sidewall 210, the user can place a cup and/or a fry container within openings 232 and 234, respectively. Alternatively, if holder 222 is positioned within the opening, holder 222 can be pushed inwardly such that holder 222 may actuate and extend from the opening such that holder protrudes outwardly from sidewall 210. Then the user may place a cup and/or a fry container within openings 232 and 234, respectively.

The user may also store items, such as waste products, within receptacle 250. For example, the user may slide receptacle 250 at least partially out of passageway 248 and place waste products within cavity 252. Then user may slide receptacle 250 back into passageway 248 such that cavity 252 is covered by at least a portion of main body 200 and the objects contained within cavity 252 are securely positioned therein. The user may also load relatively long objects, such as skis, within vehicle rear portion 108. More specifically, receptacle 250 can be completely removed from within passageway 248. When receptacle 250 is removed, items, such as the skis, can extend in vehicle rear portion 108 by having at least a portion of the skis be positioned within passageway 248.

As compared to known consoles or storage assemblies for use in a vehicle, the embodiments described herein include a console or storage assembly for use in a rear portion of a vehicle, wherein the storage assembly provides a combination of various features and does not block or inhibit the ability to load relatively long items, such as skis, within the rear portion of the vehicle. More specifically, the storage assembly includes a main body that includes at least one surface, at least one sidewall, and at least one recess portion defined within the surface. The recess portion is configured to contain at least one object therein. At least one holder is coupled to the sidewall, wherein the holder includes at least one opening such that a container is positionable within the opening. At least two legs extend outwardly from the main body to a surface of the vehicle such that the main body is positioned a predefined distance substantially vertically from the vehicle surface. A passageway is defined between the two legs. A receptacle is removably coupled within the passageway, wherein at least a portion of at least one item is positionable within the passageway when the receptacle is removed. Accordingly, the storage assembly includes the combination of at least one storage area, at least one holder, and a receptacle for waste or additional storage. Since the storage assembly is positioned in the rear portion of the vehicle, a passenger in the rear portion is able to reach the various components of storage assembly. Moreover, when the receptacle is removed, longer items, such as skis, can extend in the rear portion of the vehicle by having at least a portion of the skis be positioned within the passageway.

Exemplary embodiments of systems, apparatus, and methods are described above in detail. The systems, apparatus, and methods are not limited to the specific embodiments described herein, but rather, components of each system, apparatus, and/or steps of each method may be utilized independently and separately from other components and/or steps described herein. For example, each system may also be used in combination with other systems and methods, and is not limited to practice with only systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A storage assembly for use in a rear portion of a vehicle, said storage assembly comprising:
   a body comprising at least one surface, at least one sidewall, and at least one recess portion defined within said at least one surface, wherein said at least one recess portion is sized to contain at least one object therein;
   at least one holder coupled to said at least one sidewall, said at least one holder laterally movable with respect to said body between a first position and a second position, wherein said at least one holder comprises at least one opening defined therein that is sized to receive a container therein;
   at least two legs extending from said body for supporting said body a predefined distance above a floor of the vehicle rear portion, said at least two legs are spaced a predefined distance apart such that a passageway is defined therebetween; and
   a receptacle removably coupled within said passageway such that at least a portion of at least one item transported within the vehicle may extend through said passageway when said receptacle is removed.

2. A storage assembly in accordance with claim 1, wherein said at least one opening is at least one of substantially circular and substantially rectangular.

3. A storage assembly in accordance with claim 1, further comprising a cover coupled to at least a portion of said body such that said cover extends across over at least a portion of said at least one surface.

4. A storage assembly in accordance with claim 1, wherein said at least one recess portion comprises a first recess portion and a second recess portion spaced a predefined distance from said first recess portion.

5. A storage assembly in accordance with claim 1, wherein said at least one sidewall comprises a first sidewall, a second sidewall coupled to said first sidewall, a third sidewall coupled to said second sidewall, and a fourth sidewall coupled to each of said third sidewall and said first sidewall.

6. A storage assembly in accordance with claim 5, wherein said at least one holder comprises a first holder coupled to said first sidewall, a second holder coupled to said second sidewall, a third holder coupled to said third sidewall, and a fourth holder coupled to said fourth sidewall.

7. A storage assembly in accordance with claim 1, wherein said at least one opening comprises a first opening and a second opening spaced a predefined distance from said second opening.

8. A vehicle comprising:
   at least one seat positioned in a rear portion of said vehicle; and
   a storage assembly positioned in said rear portion and positioned proximate to said at least one seat, wherein said storage assembly comprises:
   a body comprising at least one surface, at least one sidewall, and at least one recess portion defined within said at least one surface, wherein said at least one recess portion is sized to contain at least one object therein;
   at least one holder coupled to said at least one sidewall, said at least one holder laterally movable with respect to said body between a first position and a second position, wherein said at least one holder comprises at least one opening defined therein that is sized to receive a container therein;
   at least two legs extending from said body for supporting said body a predefined distance above a floor of said rear portion, said at least two legs are spaced a predefined distance apart such that a passageway is defined therebetween; and
   a receptacle removably coupled within said passageway such that at least a portion of at least one item transported within said vehicle may extend through said passageway when said receptacle is removed.

9. A vehicle in accordance with claim 8, wherein said at least one opening is at least one of substantially circular and substantially rectangular.

10. A vehicle in accordance with claim 8, wherein said at least one seat comprises a first seat and a second seat, said storage assembly is positioned between said first seat and said second seat.

11. A vehicle in accordance with claim 8, wherein said storage assembly further comprises a cover coupled to at least a portion of said body such that said cover extends across over at least a portion of said at least one surface.

12. A vehicle in accordance with claim 8, wherein said at least one recess portion comprises a first recess portion and a second recess portion spaced a predefined distance from said first recess portion.

13. A vehicle in accordance with claim 8, wherein said at least one sidewall comprises a first sidewall, a second sidewall coupled to said first sidewall, a third sidewall coupled to said second sidewall, and a fourth sidewall coupled to each of said third sidewall and said first sidewall.

14. A vehicle in accordance with claim 13, wherein said at least one holder comprises a first holder coupled to said first sidewall, a second holder coupled to said second sidewall, a third holder coupled to said third sidewall, and a fourth holder coupled to said fourth sidewall.

15. A vehicle in accordance with claim 8, wherein said at least one opening comprises a first opening and a second opening spaced a predefined distance from said second opening.

16. A storage assembly for use in a rear portion of a vehicle, said storage assembly comprising:
   a body comprising at least one surface, a first sidewall facing a front portion of the vehicle, a second sidewall facing the vehicle rear portion, a third sidewall facing a first side portion of the vehicle, a fourth sidewall facing a second side portion of the vehicle, and at least one recess portion defined within said at least one surface, wherein said at least one recess portion is sized to contain at least one object therein;

a plurality of holders comprising a first holder coupled to said first sidewall, a second holder coupled to said second sidewall, a third holder coupled to said third sidewall, and a fourth holder coupled to said fourth sidewall, wherein said first holder is longitudinally extendable towards the vehicle front portion and longitudinally retractable towards the vehicle rear portion, said second holder is longitudinally extendable towards the vehicle rear portion and longitudinally retractable towards the vehicle front portion, said third holder is laterally extendable towards the vehicle first side portion and laterally retractable towards the vehicle second side portion, said fourth holder is laterally extendable towards the vehicle second side portion and laterally retractable towards the vehicle first side portion, wherein each of said plurality of holders comprises at least one opening defined therein that is sized to receive a container therein;

at least two legs extending from said body for supporting said body a predefined distance above a floor of the vehicle rear portion, said at least two legs are spaced a predefined distance apart such that a passageway is defined therebetween; and a receptacle removably positionable within said passageway such that at least a portion of at least one item transported within the vehicle may extend through said passageway when said receptacle is removed.

17. A storage assembly in accordance with claim 16, wherein said at least one opening is at least one of substantially circular and substantially rectangular.

18. A storage assembly in accordance with claim 16, further comprising a cover coupled to at least a portion of said body such that said cover extends across over at least a portion of said at least one surface.

19. A storage assembly in accordance with claim 16, wherein said at least one recess portion comprises a first recess portion and a second recess portion spaced a predefined distance from said first recess portion.

20. A storage assembly in accordance with claim 16, wherein said at least one opening comprises a first opening and a second opening spaced a predefined distance from said second opening.

\* \* \* \* \*